May 15, 1956 J. M. NEIL 2,745,451
AUTOMATIC RESETTING SCREW-HOLDING SCREW DRIVER
Filed March 21, 1952 2 Sheets-Sheet 1
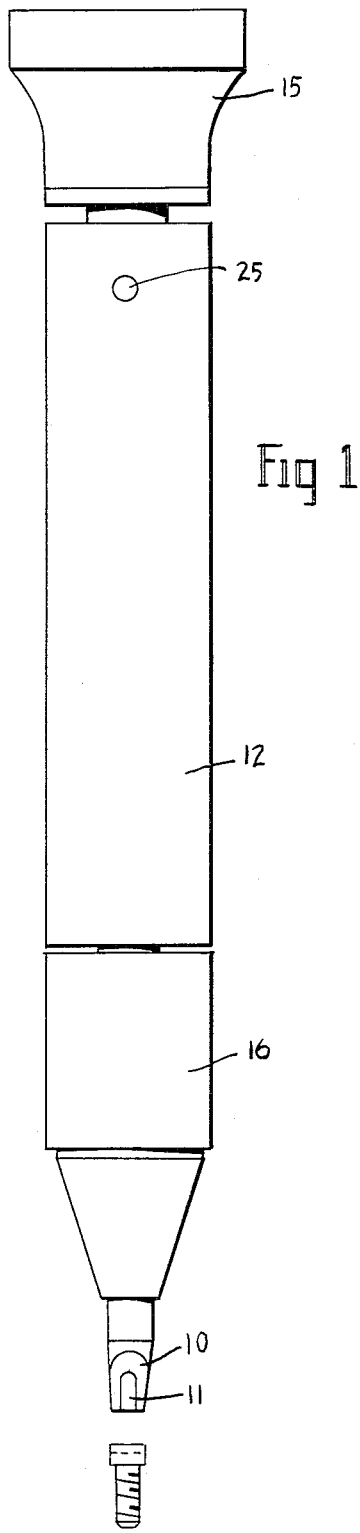
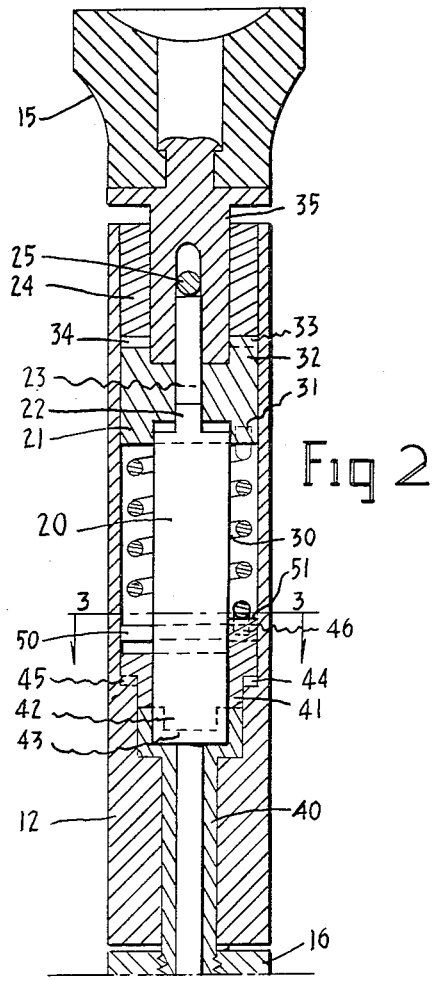
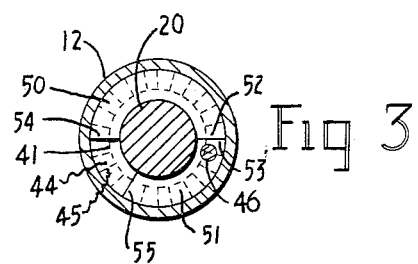
INVENTOR.
JAMES M NEIL
BY
ATTORNEY May 15, 1956      J. M. NEIL      2,745,451
AUTOMATIC RESETTING SCREW-HOLDING SCREW DRIVER Filed March 21, 1952      2 Sheets-Sheet 2

INVENTOR.
JAMES M. NEIL
BY
ATTORNEY

United States Patent Office 2,745,451
Patented May 15, 1956

2,745,451
AUTOMATIC RESETTING SCREW-HOLDING SCREW DRIVER

James M. Neil, Oakland, Calif.

Application March 21, 1952, Serial No. 277,826

15 Claims. (Cl. 145—50)

This invention relates to tools for handling articles, such as screws. In addition to the well-known screw drivers, there have been developed tools for holding screws until they are started.

It is an object of this invention to provide a tool which can be utilized for holding the screw and which can also be used as a regular screw driver for turning and tightening the screw.

Various means have heretofore been devised for holding the screw. These, in general, consist of two members which, after being introduced into the slot of the screw, are relatively displaced by expanding, rotating, or wedging in order to grip the walls of the screw slot. My invention does not lie in the aforementioned holding means per se but in a novel way of controlling the operation thereof; and accordingly I do not wish to be limited to any specific form of holding means.

For purposes of disclosure I will herein show my invention embodied in screw drivers employing a bifurcated bit for turning the screw with an element rotatable therein for gripping the screw.

A further object of my invention is to overcome certain operational disadvantages heretofore found in screw drivers of this type. This I accomplish by making both the bit and the gripping element rotatable with respect to the handle. I then dispose a torsion spring between the bit and the gripping element so that it tends to rotate them in opposite directions, but they are normally prevented from rotating in the handle by two normally-closed clutches; one between the bit and the handle, the other between the gripping element and the handle.

My screw driver functions as follows: To attach the screw to the screw driver I release the clutch between the gripping element and the handle so that the spring can turn the gripping element relative to the bit and the handle. The screw is then started and as it is tightened the clutch between the bit and the handle automatically opens, permitting the spring to be retensioned and the gripping element to be reset in its original position flush with the bit by the normal turning of the handle.

Other objects and advantages of my invention will appear in the following detailed description by reference to the drawings wherein:

Figure 1 is an elevation of one modification.

Figure 2 is a partial vertical section thereof.

Figure 3 is a horizontal section taken on the line 3—3 in Figure 2.

Figure 4:
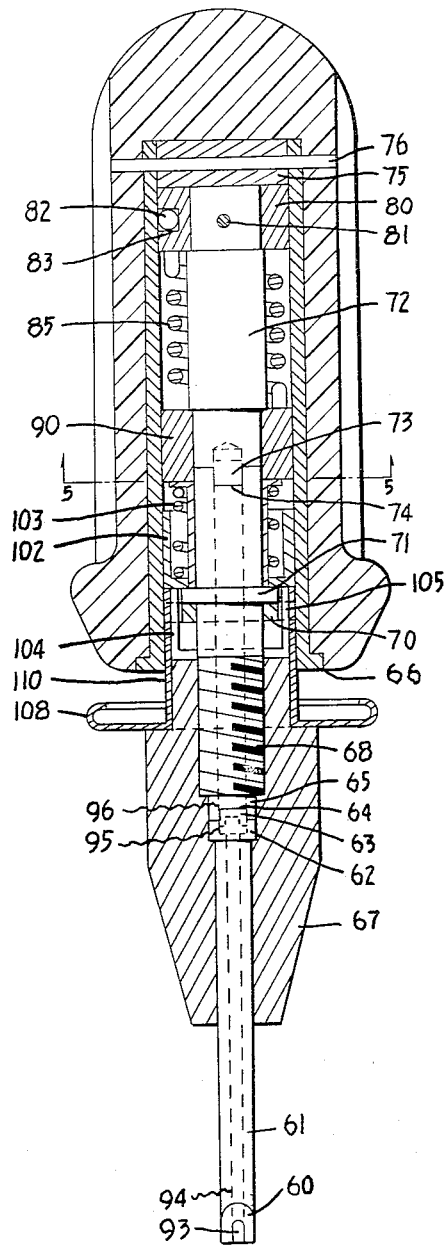
Figure 4 is a vertical section of another modification.

The screw driver shown in Figure 1 was designed for very small screws and satisfactorily handles a screw having a slot 0.010" wide and 0.070" long. It has a bifurcated bit 10 for turning the screw and a gripping element 11 rotatable in the bit for holding the screw. These members are carried in a handle 12. At the top of the tool is a freely-rotatable button 15 similar to that provided in jewelers' screw drivers as a finger tip guide. In accordance with my invention this button is depressible to release the gripping element 11. As will presently appear the gripping element is automatically reset when the operator turns the handle to tighten the screw.

For detaching a screw the bit has secured thereto a finger piece 16 which the operator turns relative to the handle to manually reset the gripping element.

Referring now to Figure 2 the mechanism for operating the gripping element will be described first. Connected to the gripping element is a shaft 20 disposed coaxially in the handle 12 and rotatable therein.

It will be recalled that the gripping element is connected to the handle by a normally-closed clutch. One clutch member 21 is mounted on the shaft 20 for axial reciprocation thereon. A tongue 22 on shaft 20 fits in a transverse slot 23 in clutch member 21, so that the clutch member rotates in unison with the shaft, but may be slid downwardly thereon for disengagement from the other clutch member 24 which is rigidly secured to the handle 12 by a pin 25.

The means for rotating the gripping element is the coil spring 30 which is under compression and urges the clutch member 21 upwardly into normally-closed engagement with the other clutch member. The spring is also under torsion and its end 31 fits in a hole in clutch member 21, tending to rotate the clutch member, shaft 20 and gripping element 11 counter-clockwise, as viewed from above. Clutch member 21 has an annular shoulder 32 on which are stamped ratchet teeth 33 extending radially of the axis of the clutch. When the clutch is closed the teeth 33 mesh with oppositely-disposed ratchet teeth 34 on clutch member 24, the teeth being arranged to oppose the counter-clockwise rotation of the clutch member 21 by the spring 30.

The opening of the clutch and consequent release of the gripping element is effected by the operator depressing the button 15 which is rotatably attached to a plunger 35 reciprocably mounted on pin 25 and in clutch member 24. Plunger 35 seats in clutch member 21 so that when the button is depressed the clutch is opened and clutch member 21 rotates counter-clockwise with respect to handle 12 until the element 11 has turned in the bit 10 to grip the screw. Thereafter the operator releases the button and the spring closes the clutch, thereby locking the screw on the screw driver. The clutch member 21 in moving upwardly to reengage the clutch member 24 raises the plunger and button to their original position.

The automatic resetting of the gripping element mechanism as the handle is turned to tighten the screw will next be described. This is made possible by making the bit rotatable in the handle and connecting it to the handle through a normally-closed clutch. The bit is connected to a sleeve 40 which encompasses the lower end of shaft 20 and is rotatably mounted in the handle 12. Clutch member 41 is slidably but non-rotatably connected to sleeve 40 by tongues 42 engaging slots 43 in an annular flange at the upper end of the sleeve.

The clutch between the bit and the handle is the same type as that described above. Ratchet teeth 44 on clutch member 41 engage opposed teeth 45 stamped in an annular shoulder in the handle. The spring 30 presses the clutch member 41 downwardly into normally-closed position and by means of its end 46 (Figs. 2 and 3) fitting into a hole in clutch member 41 tends to turn the latter clockwise in the handle, such rotation being normally opposed by the meshing ratchet teeth 44, 45.

It will now be apparent that as the operator turns the handle to tighten the screw the bit will meet with increasing resistance from the screw until the torque delivered by the handle through the clutch 41 to the bit is sufficient to cause the ratchet teeth 44 to cam out of engagement against the pressure of the spring whereupon the clutch opens and the bit stands arrested as the handle continues to turn. Because the clutch between the gripping element and the handle is closed at this time, the end 31 of the spring will be turned clockwise with respect to the other end 46 which is standing still, thereby retensioning the spring and restoring the gripping element to its original position flush with the bit.

It will be understood that after the gripping mechanism has been released all the torque from the handle is transmitted to the bit through its clutch 41, however, as soon as the gripping mechanism has been reset, as just described, it is necessary to cause this clutch to close in order to retain the tension in the spring and to lock the bit and gripping element in their original flush position. Also it is necessary to provide means for transmitting torque from the handle directly to the bit so that forces greater than those transmittable through the clutch may be applied to the bit directly in the manner of an ordinary screw driver.

This is accomplished by providing cooperating limit stops between the bit and the gripper element. One stop is in the form of a semicircular flange 50 (Figs. 2 and 3) on shaft 20. The other stop is a raised segment 51 on clutch member 41. Normally the edge 52 of flange 50 contacts the edge 53 of segment 51, as shown in Figure 3, and the other two edges 54 and 55 are spaced apart. When the gripping element is released, shaft 20 rotates counter-clockwise and edge 54 of flange 50 moves toward edge 55 until the screw is gripped. While the gripping mechanism is being reset the segment 51 is standing still and the handle 12 and shaft 20 are rotating clockwise (Fig. 3). The stops are so set that the restoration of the gripping element is complete when edge 52 again arrives in contact with edge 53. Further clockwise torque applied to handle 12 is thereafter transmitted from shaft 20 through flange 50 to segment 51; and clutch member 41, now positively rotated in unison with the handle, is automatically closed by the spring.

Figure 5:
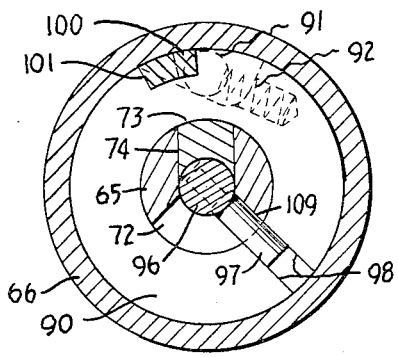
Figure 5 is an enlarged horizontal section taken on line 5—5 in Figure 4.
Figure 6:
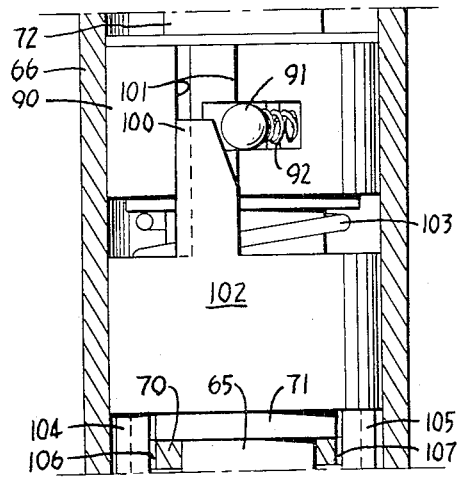
Figure 6 is an enlarged partial vertical section with the clutch and its control in elevation.

To illustrate that my invention may be embodied in different forms of screw drivers I have shown another modication in Figures 4, 5 and 6. In this modification the same operational advantages are obtained and the mode of operation is basically the same as that of the first modification. There are, however, certain structural differences, such as the use of ball clutches and a lift type release at the lower end of the handle.

In order to facilitate explanation of the drawing the means for connecting the bit to the handle will be described first. The bit 60 is formed on the lower end of a sleeve 61 which has an annular flange 62 on its upper end. Tongues 63 extending upwardly from the flange are adapted to be fitted into slots 64 in the lower end of a sleeve 65 which is rotatably mounted in the handle 66. The sleeve 61 is held in driving engagement with the sleeve 65 by a nose 67 threaded onto the sleeve 65 at 68. The bit (and the gripping element, as will later appear) are removable from the screw driver for replacement with new bits or bits of different sizes, by unscrewing the nose 67.

The sleeve 65 has rotary bearing in a wall 70 integral with the handle 66 and also has a flange 71 which bears against the upper face of the wall 70. The upper end of the sleeve 65 is connected to a shaft 72 by means of a tongue 73 on the shaft engaging in a transverse slot 74 in the sleeve. Also see Figure 5. The upper end of shaft 72 is retained by a cylindrical plug 75 secured in the handle 66 by a pin 76.

The clutch 80, which comprises a cylindrical body secured to the shaft 72 by a pin 81, has a spring-pressed ball 82 retained in a groove 83 in the body which is adapted to frictionally engage the inside wall of the handle. The ball and spring are arranged to oppose clockwise (viewed from above) rotation of the clutch 80 relative to the handle. The clutch 80 tends to rotate clockwise under the influence of the torsion spring 85.

Turning now to the mechanism for operating the gripping element which is connected to the handle by another ball clutch 90 rotatably mounted on shaft 72. This clutch is urged clockwise (as viewed from below) by the spring 85, but its ball 91 (Fig. 5) and spring 92 are arranged to oppose such movement.

The gripping element 93 (Fig. 4) is formed on the lower end of a shaft 94 which is detachably connected at 95 to a shaft 96 rotatable in the sleeve 65. The upper end of shaft 96 has riveted therein a radial stud 97 (Fig. 5) which lies in a groove 98 in the lower face of the clutch 90 so that the shaft 96 and clutch 90 are connected together for rotation.

Means are provided for releasing the clutch 90 so that the spring 85 can rotate the clutch, shaft 96 and gripping element 93. This comprises a cam 100 (Fig. 6) which slides in a groove 101 extending across the periphery of the clutch 90. When the cam is raised from its inoperative position (Fig. 6) it cams the ball 91 (Fig. 5) out of contact with the inside wall of the handle, thereby releasing the clutch.

The cam 100 is an integral part of a cylindrical cup 102 (Figs. 4 and 6) which is urged downwardly against the flange 71 of the sleeve 65 by a light compression spring 103. The device for lifting the cup is a sleeve 110 freely movable on the nose 67 and slidable in the handle 66. The sleeve 110 has two fingers 104, 105 which extend upwardly through slots 106, 107 in the wall 70 to contact the cup 102. A cylindrical flange 108 is engaged by the operator's finger for lifting the sleeve 110 and the cup 102 to open the clutch 90.

Briefly the operation is as follows: When clutch 90 is opened spring 85 turns the gripping element 93 to grasp the screw. When, in the course of tightening the screw, the clutch 80 opens, further movement of the handle resets the gripping elements and retensions the spring 85. During this movement the stud 97 (Fig. 5) returns counter-clockwise to its original position in contact with wall 109 of a V-shaped slot in the end of sleeve 65 which serves as a limit stop. Thereafter torque of the handle is transmitted through clutch 90 and stud 97 to sleeve 65 and thence to the bit, thus permitting clutch 80 to close and retain the tension in the spring.

I claim:

1. A tool for handling screws and the like comprising a handle, two screw-engaging members mounted in said handle for rotation relative to said handle and for rotation relative to each other, normally-restrained spring means for urging said members in opposite directions to grip the screw, and a device for releasing said spring means.

2. A tool for handling screws and the like comprising a handle, two screw-engaging members mounted in said handle for rotation relative to said handle and for rotation relative to each other, normally-restrained spring means for urging said members in opposite directions to grip the screw, a device for releasing said spring means, and means operated by turning said handle for re-energizing said spring means.

3. A tool for handling screws and the like comprising a handle, two members for gripping the screw, said members being supported by said handle for movement relative to said handle and for movement relative to each other, a spring interposed between said members, one end of said spring urging one of said members in one direction, the other end of said spring urging said other member in another direction, means for normally restraining said members from movement relative to said handle, a control on said handle operable to release one of said members for movement by said spring, and a device movable with respect to said handle and adapted to co-operate therewith to release said other member for movement relative to said handle to re-energize said spring.

4. A tool for handling screws and the like comprising a handle, two members for gripping the screw mounted in said handle for rotation relative thereto and relative to each other, a torsion spring tending to turn said members in opposite directions in said handle, and means normally preventing said spring from turning said members relative to said handle, including a clutch between one member and said handle, said clutch being adapted to be opened to permit said one member to be turned relative to said handle by said spring.

5. A tool for handling screws and the like comprising a handle, two members for gripping the screw mounted in said handle for rotation relative thereto and relative to each other, a torsion spring tending to turn said members in opposite directions in said handle, and means normally preventing said spring from turning said members relative to said handle, including a clutch between one member and said handle, said clutch being adapted to be opened to permit said one member to be turned relative to said handle by said spring, and including another clutch between the other of said two members and said handle, said other clutch being adapted to permit relative movement between said other member and said handle to wind said spring.

6. A screw driver having a handle, a bit connected to said handle, an element rotatably mounted in said handle movable from an initial position relative to said bit to grip the screw, a spring for moving said element, and means automatically operable when said handle is turned to tighten the screw for returning said element to said initial position and for re-tensioning said spring, said means including means to disconnect said bit from said handle.

7. A screw driver having a handle which is turned clockwise to tighten a screw, a bit rotatably mounted in said handle, means to prevent said bit from rotating clockwise in said handle, an element rotatably mounted in said bit adapted to be rotated counter-clockwise from an initial position in said bit to a screw-gripping position, and means to enable said handle to turn said element clockwise in said bit to return said element to said initial position.

8. A screw driver having a handle which is turned clockwise to tighten a screw, a bit rotatably mounted in said handle, means to prevent said bit from rotating clockwise in said handle, an element rotatably mounted in said bit adapted to be rotated counter-clockwise from an initial position in said bit to a screw-gripping position, means to enable said handle to turn said element clockwise in said bit to return said element to said initial position, and means to enable said element to transmit clockwise torque from said handle to said bit when said element is in said initial position.

9. A screw driver having a handle which is turned clockwise to tighten a screw, a bit rotatably mounted in said handle, means to prevent said bit from rotating clockwise relative to said handle, an element rotatably mounted in said bit adapted to be rotated counter-clockwise from an initial position in said bit to a screw-gripping position, and means for rotating said bit counter-clockwise relative to said handle until said element is in said initial position.

10. A screw driver having a handle which is turned clockwise to tighten a screw, a bit rotatably mounted in said handle, means to prevent said bit from rotating clockwise relative to said handle, an element rotatably mounted in said bit adapted to be rotated counter-clockwise from an initial position in said bit to a screw-engaging position, a spring connected to said bit for rotating said element counter-clockwise, means connected to said handle for preventing said spring from rotating said element, means for disconnecting said element from said handle until said element has gripped the screw and thereafter for allowing said connecting means to again connect said element to said handle so that clockwise rotation of said handle will rotate said element clockwise in said bit to return said element to said initial position and to re-energize said spring.

11. A screw driver having a handle, a bit rotatably mounted in said handle, an element rotatably mounted in said handle, means to rotate said element relative to said bit to grip a screw, and means to prevent rotation of said element relative to said handle when said handle is turned to tighten the screw.

12. A screw driver having a handle, a bit connected to said handle, an element connected to said handle adapted to cooperate with said bit to grip a screw when said element is operative, means for disconnecting said element from said handle to render said element operative, and mechanism, including means for connecting said element to said handle and for disconnecting said bit from said handle, for automatically rendering said element inoperative when said handle is manipulated to drive a screw.

13. A tool for holding a screw while the screw is being inserted in a threaded hole for driving the screw after the screw is started until the screw is tight, said tool having a bit, an element adapted to be projected from said bit to hold the screw on said bit, and a mechanism to prevent retraction of said element prior to the time the tool begins driving the screw and to cause retraction of said element after the tool beings driving the screw, said mechanism including a clutch which connects said element and said bit when the tool is holding the screw and which automatically disconnects said element and said bit when the tool is driving the screw.

14. A screw driver having a handle, a bit rotatable in said handle, a screw-gripping element rotatable in both said handle and said bit, a spring between said bit and said element tending to turn said element in one direction to a screw-engaging position, a clutch holding said element in a first position in said handle, a manual control on said handle for disengaging said clutch, said clutch serving to connect said element to said handle in a second position when said control is released, a one-way clutch holding said bit in a first position in said handle and preventing rotation of said bit by said spring, said one-way clutch serving to automatically release said bit from said handle when said handle is turned to tighten the screw and serving to hold said bit in a second position in said handle when said spring has been rewound during the turning of said handle, said control being then operable to again release said element for rotation to a third position in said handle, said one-way clutch thereafter being operable to release said bit from said handle for again rewinding said spring by said handle and for holding said bit in a third position in said handle after said spring is rewound, and so on.

15. A screw driver having a handle, a bit mounted for rotation in said handle, a screw-gripping element within said bit mounted for rotation in said handle, a torsion spring, one end of said spring being connected to said element to rotate said element in one direction relative to said handle, the other end of said spring being connected to said bit to rotate said bit in the opposite direction relative to said handle, and means in said handle normally operative to prevent rotation of said bit and said element by said spring, a manual control to release said element for rotation in said handle by unwinding of said one end of said spring, and an automatic control for releasing said bit from said handle to enable said handle to rotate relative to said bit to wind said other end of said spring.

References Cited in the file of this patent
UNITED STATES PATENTS

| | | |
|---|---|---|
| 1,271,816 | White | July 9, 1918 |
| 1,781,470 | Mueller | Nov. 11, 1930 |
| 2,150,184 | Pearson | Mar. 14, 1939 |
| 2,566,683 | Thompson | Sept. 4, 1951 |

FOREIGN PATENTS

| | | |
|---|---|---|
| 197,371 | Switzerland | Aug. 1, 1938 |